(12) United States Patent
Zwisler et al.

(10) Patent No.: US 8,495,348 B2
(45) Date of Patent: Jul. 23, 2013

(54) EFFICIENT ROOT BOOTING WITH SOLID STATE DRIVES AND REDIRECT ON WRITE SNAPSHOTS

(75) Inventors: Ross Zwisler, Lafayette, CO (US); Brian McKean, Longmont, CO (US)

(73) Assignee: LSI Corporation, Milpitas, CA (US)

(*) Notice: Subject to any disclaimer, the term of this patent is extended or adjusted under 35 U.S.C. 154(b) by 1027 days.

(21) Appl. No.: 12/215,223

(22) Filed: Jun. 26, 2008

(65) Prior Publication Data
US 2009/0327685 A1 Dec. 31, 2009

(51) Int. Cl.
*G06F 9/00* (2006.01)
*G06F 15/177* (2006.01)
*G06F 1/24* (2006.01)
*G06F 21/00* (2013.01)
*H04L 29/06* (2006.01)

(52) U.S. Cl.
USPC ............... 713/2; 713/100; 713/150; 713/191

(58) Field of Classification Search
USPC ............ 713/200, 2, 100, 150, 191; 711/113, 711/114, 129
See application file for complete search history.

(56) References Cited

U.S. PATENT DOCUMENTS

| | | | | |
|---|---|---|---|---|
| 6,567,889 B1* | 5/2003 | DeKoning et al. | ............ | 711/114 |
| 6,883,093 B2* | 4/2005 | McBrearty et al. | ............ | 713/100 |
| 7,231,497 B2* | 6/2007 | Trika et al. | ............ | 711/141 |
| 7,293,166 B2* | 11/2007 | Nguyen et al. | ............ | 713/1 |
| 7,321,936 B2* | 1/2008 | Zimmerman et al. | ........ | 709/231 |
| 7,461,098 B2* | 12/2008 | Fletcher et al. | ............ | 1/1 |
| 7,739,240 B2* | 6/2010 | Saito et al. | ............ | 707/634 |
| 2002/0065840 A1* | 5/2002 | McBrearty et al. | ........... | 707/202 |
| 2003/0126200 A1* | 7/2003 | Wolff | ............ | 709/203 |
| 2005/0278486 A1* | 12/2005 | Trika et al. | ............ | 711/142 |
| 2006/0047924 A1* | 3/2006 | Aoshima et al. | ............ | 711/161 |
| 2006/0080522 A1* | 4/2006 | Button et al. | ............ | 713/2 |
| 2006/0176602 A1* | 8/2006 | Honjo et al. | ............ | 360/69 |
| 2007/0250610 A1 | 10/2007 | Haun et al. | | |
| 2007/0271307 A1 | 11/2007 | Bergsten | | |
| 2008/0140937 A1* | 6/2008 | Nalawade et al. | ............ | 711/119 |
| 2009/0276647 A1* | 11/2009 | Boyd | ............ | 713/320 |
| 2009/0307542 A1* | 12/2009 | Roohparvar | ............ | 714/704 |
| 2009/0327603 A1* | 12/2009 | McKean et al. | ............ | 711/114 |
| 2010/0079885 A1* | 4/2010 | McKean | ............ | 360/15 |
| 2010/0231745 A1* | 9/2010 | Li et al. | ............ | 348/223.1 |

FOREIGN PATENT DOCUMENTS

| | | |
|---|---|---|
| JP | 2005-128002 | 5/1993 |
| JP | 2000-259583 A | 9/2000 |
| JP | 2005-222274 A | 8/2005 |
| JP | 2005-301708 A | 10/2005 |

(Continued)

*Primary Examiner* — Idriss N Alrobaye
*Assistant Examiner* — Getente A Yimer
(74) *Attorney, Agent, or Firm* — Suiter Swantz pc llo

(57) ABSTRACT

A system and method for root booting includes a plurality of computing devices that each boot from a read-only base volume of an attached storage device that includes data common to the computing devices. The attached storage device also includes a plurality of volumes, each dedicated to one of the computing devices, which are redirect on write snapshots of the read-only base volume including unique items for the respective computing device. The read-only base volume may be stored in one or more solid state drives which may be configured as a RAID (redundant array of independent disks) and/or mirrored with one or more other storage drives. The plurality of volumes may each be stored in one or more hard disk drives which may be configured as a RAID. The attached storage device may be operable to add common data to the read-only base volume.

16 Claims, 4 Drawing Sheets

FOREIGN PATENT DOCUMENTS

| | | |
|---|---|---|
| JP | 2006-164095 A | 6/2006 |
| JP | 2006-252112 A | 9/2006 |
| JP | 2007-310508 A | 11/2007 |
| TW | I220469 B | 8/2004 |
| TW | I259400 B | 8/2006 |
| TW | I294098 B | 3/2008 |

* cited by examiner

EFFICIENT ROOT BOOTING WITH SOLID STATE DRIVES AND REDIRECT ON WRITE SNAPSHOTS

TECHNICAL FIELD

The present disclosure generally relates to the field of computing devices, and more particularly to a system and method for efficiently root booting computing devices.

BACKGROUND

Root booting is the practice of booting a computing device using a volume on an attached storage device such as an attached storage array. This volume may contain everything that a local drive would contain if the computing device booted from the local drive (such as an operating system, drivers, temporary files, application programs, and/or virtual memory swap space).

FIG. 1 illustrates a typical system 100 for root booting. The system 100 typically includes a plurality of computing devices 101 communicably connected to an attached storage device 102. Each computing device 101 typically boots from a dedicated volume 104 of the attached storage device 102 which is presented to each computing device 101 as a virtual volume 105. Then each computing device 101 typically continues to utilize its respective dedicated volume 104 (via the respective virtual volume 105) for operation. As each computing device 101 reads data from and/or writes data to its respective dedicated volume 104 (via the respective virtual volume 105) during operation, data from the respective volume 104 is typically stored in a respective area of the cache 103 of the attached storage device 102 for quicker access. FIG. 2 illustrates how each computing device 101 views the system 100. Each computing device 101 is only able to access the respective volume 104 and the respective area of the cache 103 of the attached storage device 102 for the computing device 101, though the computing device 101 is actually only aware of its respective virtual volume 105 of the attached storage device 102.

SUMMARY

A system and method for root booting may include a plurality of computing devices communicably connected to an attached storage device. Each computing device may boot from a read-only base volume of the attached storage device. The read-only base volume may include data common to the plurality of computing devices including, but not limited to one or more operating systems, drivers, temporary files, application programs, and/or virtual memory swap space. Frequently accessed data of the read-only base volume may be stored in a portion of the cache of the attached storage device. The attached storage device may also include a plurality of volumes, each dedicated to one of the plurality of computing devices, which are redirect on write snapshots of the read-only base volume. The respective volume for each computing device may include unique items for a computing device such as unique registration keys, virtual memory swap space, and/or temporary files. If any of the computing devices makes a change to the data of the read-only base volume, the change may be directed and stored in the respective volume for that computing device. Frequently accessed data of each of the volumes may be stored in a portion of the cache of the attached storage device for that respective volume. The read-only base volume, the portions of cache, and the respective volume may be presented to each of the plurality of computing devices as a virtual volume. The storage system may map data to the respective virtual volume for each of the plurality of computing devices from the read-only base volume when the data from the read-only base volume has not changed for the respective computing device and from the respective volume when the data from the read-only base volume has changed for the respective computing device.

The read-only base volume may be stored in one or more solid state drives (a data storage device that utilizes solid-state memory to store persistent data) which may be configured as a RAID (redundant array of independent disks) and/or mirrored with one or more other storage drives for redundancy purposes. The plurality of volumes may each be stored in one or more solid state drives and/or hard disk drives which may be configured as a RAID. The attached storage device may be operable to add data common to the plurality of computing devices to the read-only base volume. In this way, the read-only base volume utilized to root boot the plurality of computing devices may be updated by committing the new common data to the read-only base volume.

The present disclosure may reduce the storage space, I/O, and caching inefficiencies associated with root booting a plurality of computing devices from volumes of an attached storage device. The present disclosure may harness the read performance offered by solid state drives by storing the read-only base volume in one or more solid state drives. As only one read-only base volume may be required for the plurality of computing devices, the read performance offered by solid state drives is balanced against the typically higher cost of solid state drives as compared to hard disk drives. Further, the present disclosure does not require deduplication code in the I/O path which may result in a simpler implementation of system.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Root booting a plurality of computing devices from an attached storage device utilizing a separate volume for each computing device is inefficient. In many situations where a plurality of computing devices root boot from volumes of an attached storage device, the data contained in the separate volumes (including, but not limited to, operating systems, drivers, temporary files, application programs, and/or virtual memory swap space) may be nearly identical. Thus, storage space may be wasted. Further, as each of the plurality of servers has a separate copy of one or more operating systems, drivers, temporary files, application programs, and/or virtual memory swap space, the same data may be read from the separate volumes separately for each one of the plurality of servers. Thus, unnecessary I/O (input/output) may be experienced in order to fetch duplicate data from the separate volumes. Additionally, as the data is duplicated on the separate volumes, the separate volumes may compete for limited cache space inside the attached storage device (and/or a controller communicably connecting one of the plurality of computing devices to the attached storage device). As a result, each of the plurality of computing devices may experience more cache misses, resulting in more I/Os that have to interact with the separate volumes, stored in one or more storage drives, and slowing performance.

Figure 1:
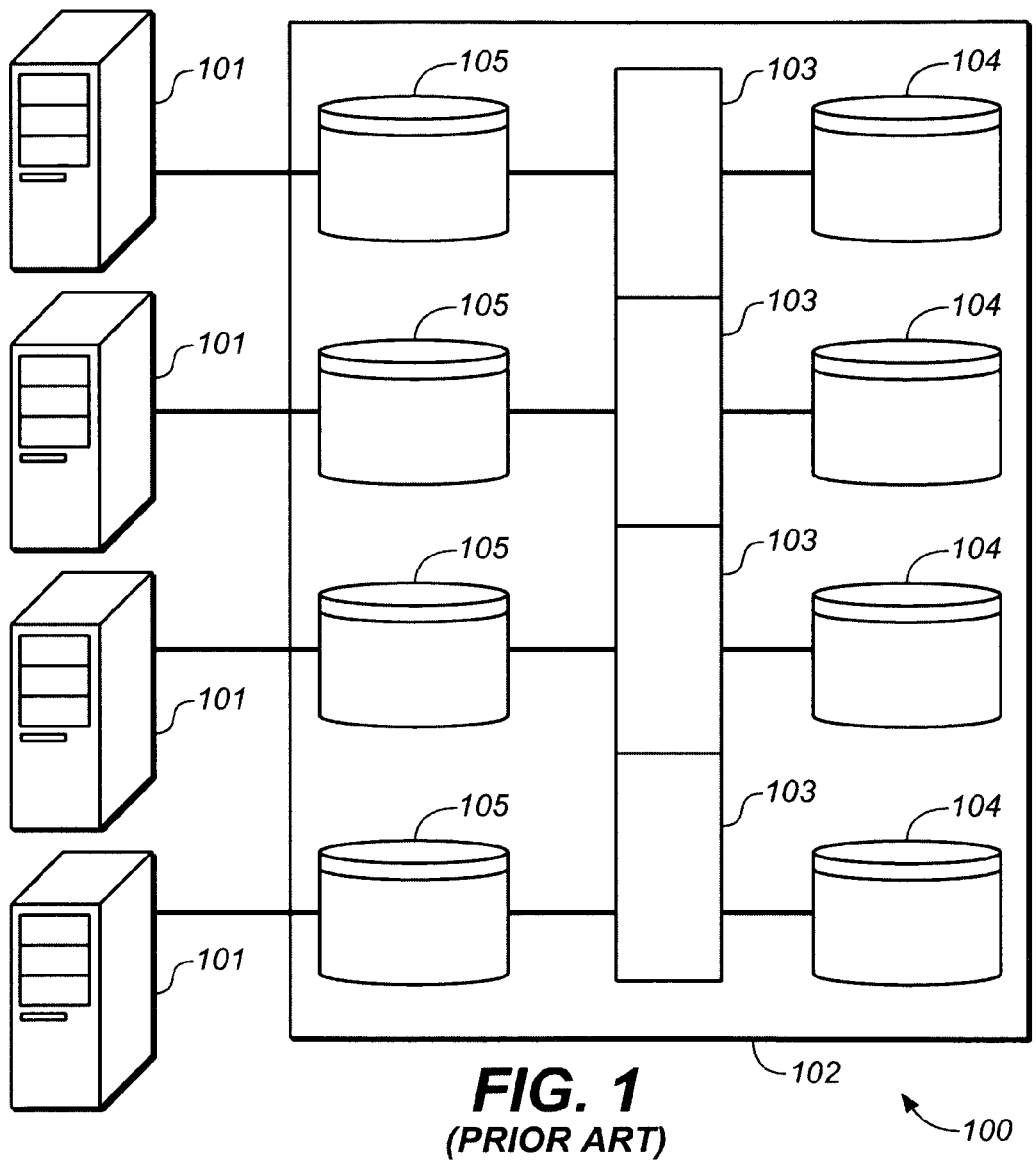
FIG. 1 is a diagram illustrating a typical system for root booting.
Figure 2:
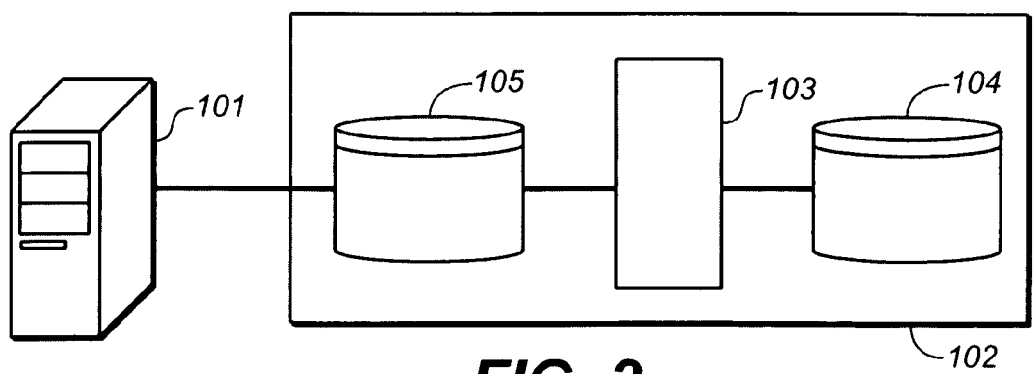
FIG. 2 is a diagram illustrating the view of the system illustrated in FIG. 1 from the perspective of one of the plurality of computing devices.
Figure 3:
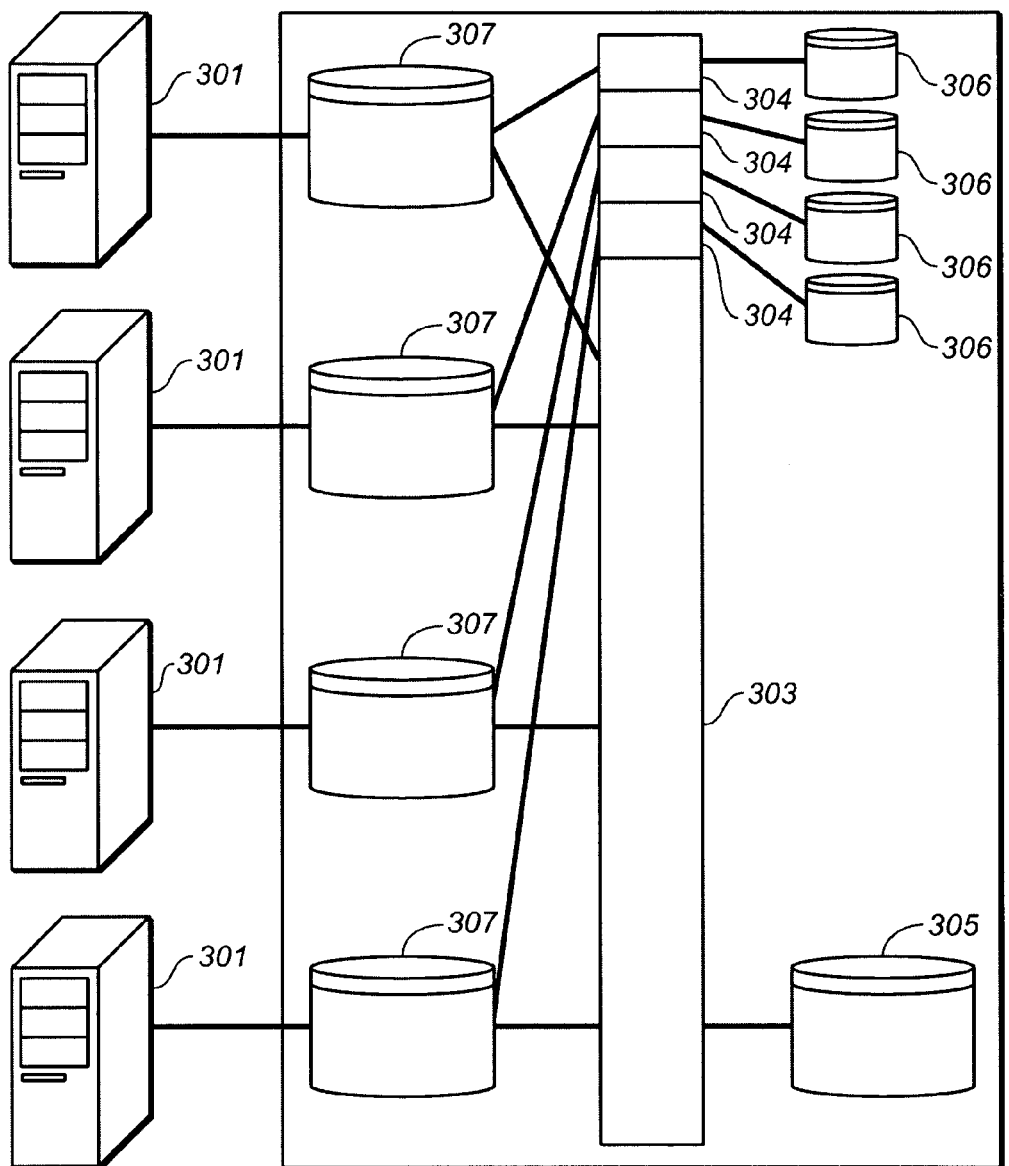
FIG. 3 is a diagram illustrating a system for root booting, in accordance with an embodiment of the present disclosure.

FIG. 3 illustrates a system 300 for root booting, in accordance with an embodiment of the present disclosure. The system 300 includes a plurality of computing devices 301 communicably connected to an attached storage device 302. The plurality of computing devices 301 may comprise any kind of digital computing devices including, but not limited to, personal desktop computers, personal laptop computers, server computers, and/or dummy terminals. Each computing device 301 may boot from a read-only base volume 305 of the attached storage device 302 which is presented to each computing device 301 as a virtual volume 307 for that computing device 301. The read-only base volume 305 may include data common to the plurality of computing devices 301 including, but not limited to one or more operating systems, drivers, temporary files, application programs, and/or virtual memory swap space. Frequently accessed data of the read-only base volume may be stored in a portion of the cache 303 of the attached storage device 302. As the portion of the cache 303 may store data of the read-only base volume frequently accessed by any of the plurality of computing devices 101 (via the respective virtual volume 307), the portion of the cache 303 may be proportionally more of the total cache than if separate volumes were utilized (which would require separate portions of cache) and more of the data for each of the plurality of computing devices 303 may be in cache at a given time, resulting in fewer cache misses. The attached storage device 302 may also include a plurality of volumes 306, each dedicated to one of the plurality of computing devices 301, which are redirect on write snapshots of the read-only base volume 305. The respective volume 306 for each computing device 301 may include unique items for that computing device 301 such as unique registration keys, virtual memory swap space, and/or temporary files. If any of the computing devices 301 makes a change to the data of the read-only base volume 305 (via the respective virtual volume 307), the change may be directed and stored in the respective volume 306 for that computing device 301. Frequently accessed data of each of the volumes 306 may be stored in a portion of the cache 304 of the attached storage device for that respective volume 306. The storage system 302 may map data to the respective virtual volume 307 for each of the plurality of computing devices 301 from the read-only base volume 305 when the data from the read-only base volume 305 has not changed for the respective computing device 301 and from the respective volume 306 when the data from the read-only base volume 305 has changed for the respective computing device 301.

The plurality of computing devices 301 may comprise diskless servers. The read-only base volume 305 may be stored in one or more solid state drives (a data storage device that utilizes solid-state memory to store persistent data). The read-only base volume 305 may be stored in one or more storage drives configured as a RAID (redundant array of independent disks). The one or more storage drives may be configured as a RAID that does not implement redundancy, such as where data is striped across a plurality of storage drives. The read-only base volume 305 may be stored in one or more storage drives that are mirrored with one or more other storage drives for redundancy purposes. If read-only base volume 305 is stored in one or more storage drives that be mirrored with one or more other storage drives, the plurality of computing devices 301 may access the read-only base volume 305 (via the respective virtual volume 307) via the one or more storage drives and not the one or more other storage drives. For example, the read-only base volume 305 may be stored in one or more solid state drives that are mirrored with one or more hard disk drives (a non-volatile storage device which stores digitally encoded data on rotating platters with magnetic surfaces) and the plurality of computing devices 301 may access the read-only base volume 305 (via the respective virtual volume 307) via the one or more solid state drives and not the one or more hard disk drives. The plurality of volumes 306 may each be stored in one or more solid state drives and/or hard disk drives. The plurality of volumes 306 may be each stored in one or more storage drives configured as a RAID. The one or more storage drives may be configured as a RAID that does not implement redundancy, such as where data is striped across a plurality of storage drives. The attached storage device 302 may comprise one or more network attached storage (NAS) devices and/or one or more storage area network (SAN) devices. The attached storage device 302 may comprise one or more RAID storage devices.

Figure 4:
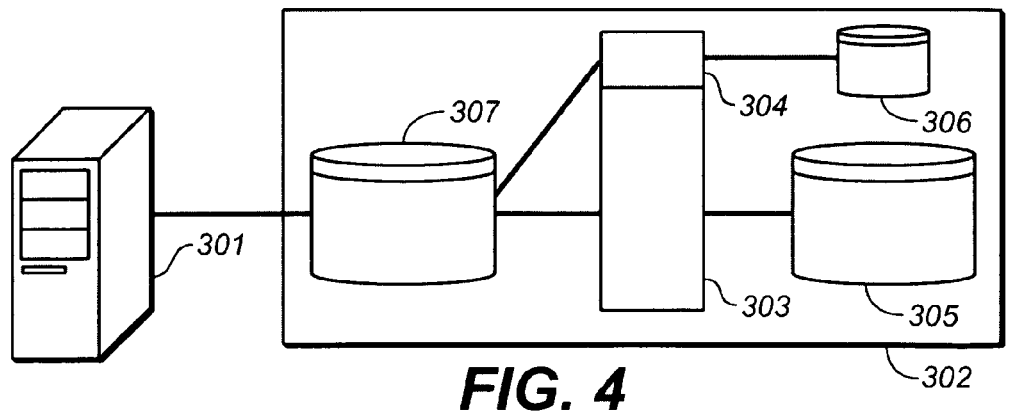
FIG. 4 is a diagram illustrating the view of the system illustrated in FIG. 3 from the perspective of one of the plurality of computing devices, in accordance with an embodiment of the present disclosure.

FIG. 4 illustrates how each computing device 301 may view the system 300. Each computing device 301 is only able to access the read-only base volume 305, the portion of the cache 303 utilized to store frequently accessed data from the read-only base volume, its respective volume 306, and the portion of the cache 303 utilized to store frequently accessed data from its respective volume 306, though the computing device 301 is actually only aware of its respective virtual volume 307 of the attached storage device 302.

The attached storage device 302 may be operable to add data common to the plurality of computing devices 301 to the read-only base volume 305. In this way, the read-only base volume 305 utilized to root boot the plurality of computing devices may be updated by committing the new common data to the read-only base volume 305.

Although the present disclosure has been illustrated and described as a plurality of computing devices that boot from a common read-only base volume of an attached storage device and each store data particular for the respective computing device to a redirect on write snapshot of the common read-only base volume dedicated to the respective computing device (both presented to each of the plurality of computing devices as a virtual volume for the respective computing device), it should be understood that more than one plurality of computing devices, each plurality booting from a separate read-only base volume that is common to the respective plurality of computing devices, without departing from the scope of the present disclosure. For example, ten Linux servers and ten Microsoft Windows servers may both be communicatively coupled to the same attached storage device. The ten Linux servers may boot from a Linux read-only base volume of the attached storage device common to the ten Linux servers and the ten Microsoft Windows servers may boot from a Windows read-only base volume of the attached storage device common to the ten Microsoft Windows servers.

The present disclosure may reduce the storage space, I/O, and caching inefficiencies associated with root booting a plurality of computing devices from volumes of an attached storage device. The present disclosure may harness the read performance offered by solid state drives by storing the read-only base volume 305 in one or more solid state drives. As only one read-only base volume 305 may be required for the plurality of computing devices 301, the read performance offered by solid state drives is balanced against the typically higher cost of solid state drives as compared to hard disk drives. Further, the present disclosure does not require deduplication code in the I/O path which may result in a simpler implementation of system 300.

Figure 5:
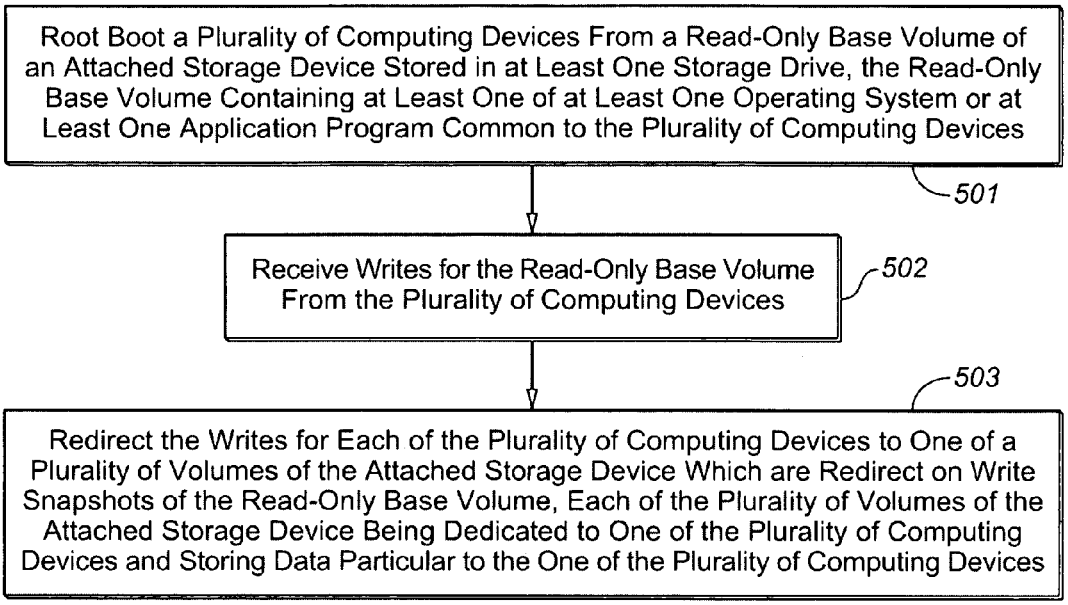
FIG. 5 is flow diagram illustrating a method for root booting, in accordance with an embodiment of the present disclosure.

FIG. 5 illustrates a method of root booting a plurality of computing devices, in accordance with an embodiment of the present disclosure. In step 501, root boot a plurality of computing devices from a read-only base volume of an attached storage device stored in at least one storage drive, the read-only base volume containing at least one of at least one operating system or at least one application program common to the plurality of computing devices. The at least one storage drive may comprise at least one solid state drive. The at least one storage drive may comprise a plurality of storage drives configured in a RAID. The plurality of computing devices may comprise a plurality of diskless computing devices. The attached storage device may comprise an attached RAID device. In step 502, receive writes for the read-only base volume from the plurality of computing devices. In step 503, redirect the writes for each of the plurality of computing devices to one of a plurality of volumes of the attached storage device which are redirect on write snapshots of the read-only base volume, each of the plurality of volumes of the attached storage device being dedicated to one of the plurality of computing devices and storing data particular to the one of the plurality of computing devices. Each of the plurality of volumes may be stored in at least one hard disk drive. Each of the plurality of volumes may be stored in a plurality of hard disk drives configured in a RAID. The data particular to the one of the plurality of computing devices may comprise at least one of at least one registration key, at least one virtual memory swap space, and/or at least one temporary file.

Figure 6:
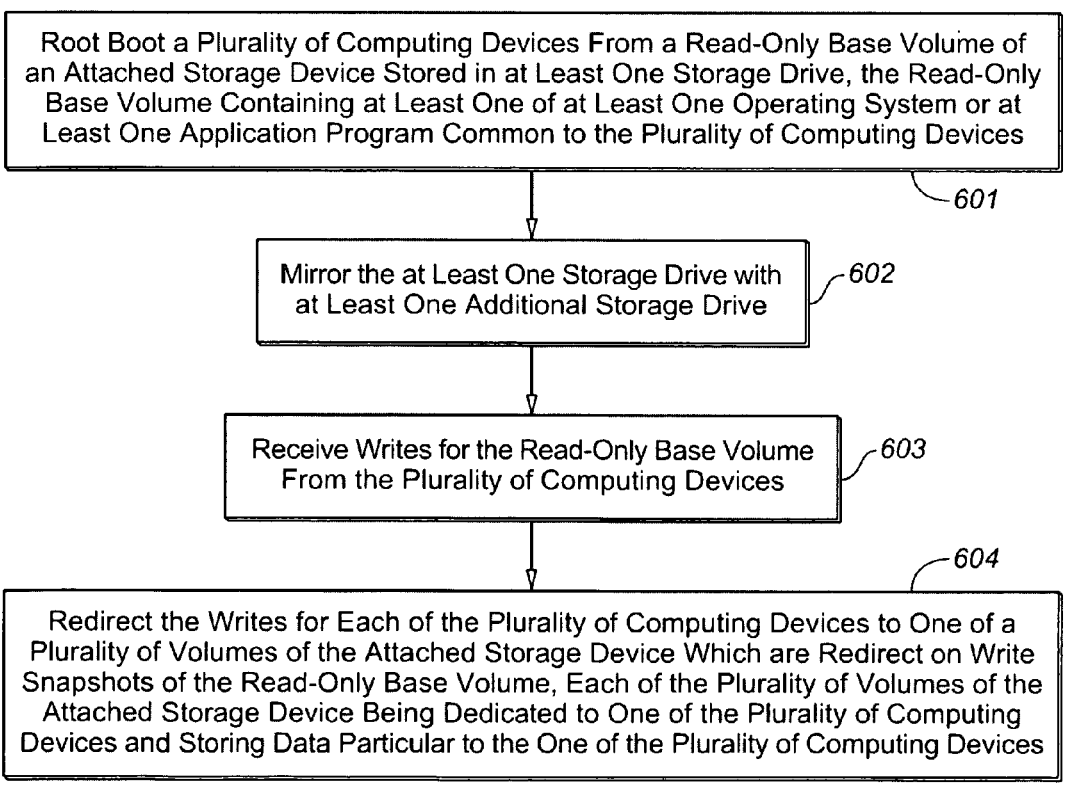
FIG. 6 is flow diagram illustrating a method for root booting, in accordance with an alternative embodiment of the present disclosure.

FIG. 6 illustrates a method of root booting a plurality of computing devices, in accordance with an alternative embodiment of the present disclosure. In step 601, root boot a plurality of computing devices from a read-only base volume of an attached storage device stored in at least one storage drive, the read-only base volume containing at least one of at least one operating system or at least one application program common to the plurality of computing devices. The at least one storage drive may comprise at least one solid state drive. The at least one storage drive may comprise a plurality of storage drives configured in a RAID. The plurality of computing devices may comprise a plurality of diskless computing devices. The attached storage device may comprise an attached RAID device. In step 602, mirror the at least one storage drive with at least one additional storage drive. In step 603, receive writes for the read-only base volume from the plurality of computing devices. In step 604, redirect the writes for each of the plurality of computing devices to one of a plurality of volumes of the attached storage device which are redirect on write snapshots of the read-only base volume, each of the plurality of volumes of the attached storage device being dedicated to one of the plurality of computing devices and storing data particular to the one of the plurality of computing devices. Each of the plurality of volumes may be stored in at least one hard disk drive. Each of the plurality of volumes may be stored in a plurality of hard disk drives configured in a RAID. The data particular to the one of the plurality of computing devices may comprise at least one of at least one registration key, at least one virtual memory swap space, and/or at least one temporary file.

Figure 7:
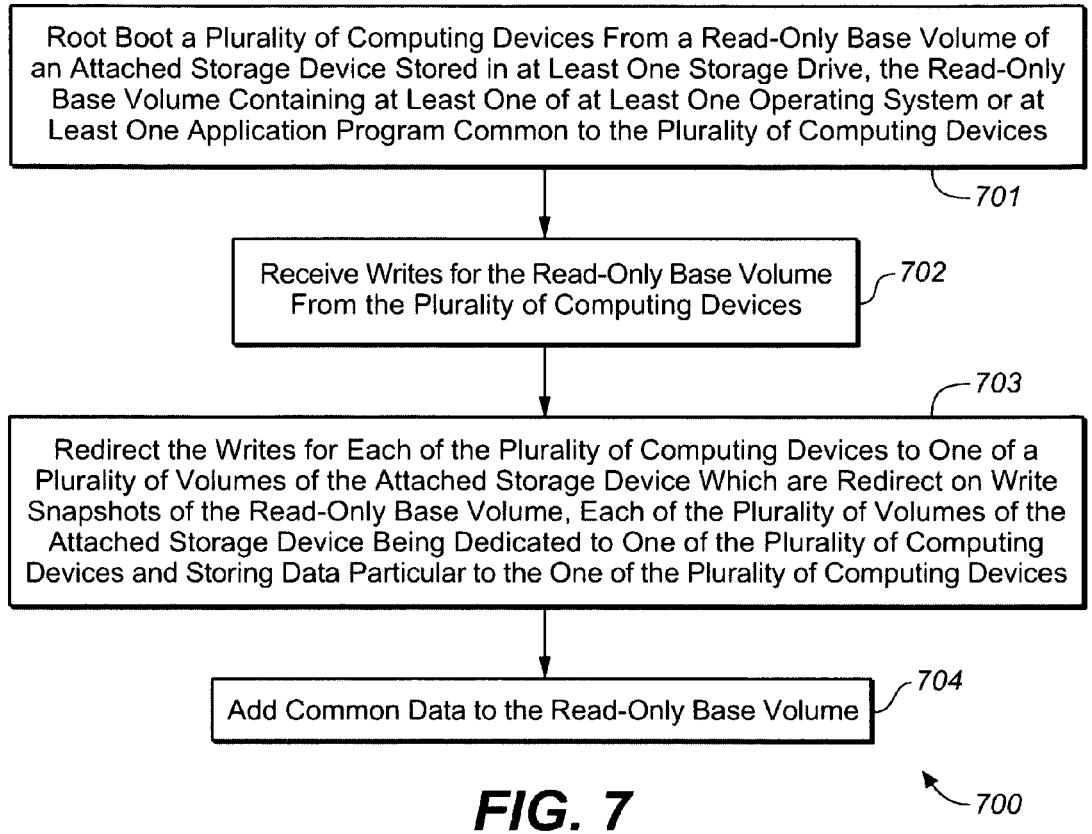
FIG. 7 is a flow diagram illustrating a method for root booting, in accordance with an alternative embodiment of the present disclosure.

FIG. 7 illustrates a method of root booting a plurality of computing devices, in accordance with an alternative embodiment of the present disclosure. In step 701, root boot a plurality of computing devices from a read-only base volume of an attached storage device stored in at least one storage drive, the read-only base volume containing at least one of at least one operating system or at least one application program common to the plurality of computing devices. The at least one storage drive may comprise at least one solid state drive. The at least one storage drive may comprise a plurality of storage drives configured in a RAID. The plurality of computing devices may comprise a plurality of diskless computing devices. The attached storage device may comprise an attached RAID device. In step 702, receive writes for the read-only base volume from the plurality of computing devices. In step 703, redirect the writes for each of the plurality of computing devices to one of a plurality of volumes of the attached storage device which are redirect on write snapshots of the read-only base volume, each of the plurality of volumes of the attached storage device being dedicated to one of the plurality of computing devices and storing data particular to the one of the plurality of computing devices. Each of the plurality of volumes may be stored in at least one hard disk drive. Each of the plurality of volumes may be stored in a plurality of hard disk drives configured in a RAID. The data particular to the one of the plurality of computing devices may comprise at least one of at least one registration key, at least one virtual memory swap space, and/or at least one temporary file. In step 704, add common data to the read-only base volume.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

What is claimed is:

1. A method, comprising:
   root booting a plurality of computing devices from a read-only base volume of an attached storage device, the read-only base volume stored in at least one solid state drive, the read-only base volume containing at least one operating system and at least one application program common to the plurality of computing devices;
   receiving writes for the read-only base volume from the plurality of computing devices;
   redirecting the writes for each of the plurality of computing devices to a particular volume of a plurality of volumes of the attached storage device, each of the plurality of volumes of the attached storage device including a redirect on write snapshot of the read-only base volume, each of the plurality of volumes of the attached storage device being dedicated to a particular computing device of the plurality of computing devices and storing data particular to the particular computing device of the plurality of computing devices, the data particular to the particular computing device comprising at least one of at least one registration key, at least one virtual memory swap space, or at least one temporary file;
   storing frequently accessed data of the read-only base volume in a dedicated portion of a cache of the attached storage device;
   storing frequently accessed data of the plurality of volumes in a plurality of dedicated portions of the cache, each dedicated portion of the plurality of dedicated portions of the cache configured to store frequently accessed data of the particular volume of the plurality of volumes;
   determining data common to each of the plurality of volumes;
   updating the read-only base volume to include the data common to each of the plurality of volumes;
   removing, from the plurality of volumes of the attached storage device, the data common to each of the plurality of volumes upon updating the read-only base volume to include the data common to each of the plurality of volumes; and
   mirroring the at least one solid state drive with at least one additional solid state drive.

2. The method of claim 1, wherein said redirecting the writes for each of the plurality of computing devices to a particular volume of a plurality of volumes of the attached storage device further comprises:
   redirecting the writes for each of the plurality of computing devices to a particular volume of a plurality of volumes of the attached storage device stored in at least one hard disk drive.

3. The method of claim 1, wherein said redirecting the writes for each of the plurality of computing devices to a particular volume of a plurality of volumes of the attached storage device further comprises:
   redirecting the writes for each of the plurality of computing devices to a particular volume of a plurality of volumes of the attached storage device stored in a plurality of hard disk drives configured in a RAID (redundant array of independent disks).

4. The method of claim 1, further comprising:
   subsequently adding new common data to the read-only base volume.

5. The method of claim 1, wherein said root booting a plurality of computing devices from a read-only base volume of an attached storage device stored in at least one solid state drive further comprises:
   root booting a plurality of diskless computing devices from a read-only base volume of an attached storage device stored in at least one solid state drive.

6. The method of claim 1, wherein said root booting a plurality of computing devices from a read-only base volume of an attached storage device stored in at least one solid state drive further comprises:
   root booting a plurality of computing devices from a read-only base volume of an attached RAID (redundant array of independent disks) device stored in at least one solid state drive.

7. The method of claim 1, wherein an amount of the portion of the cache configured to store frequently accessed data of the read-only base volume is more than a portion of the cache if the cache were divided proportionally among the plurality of volumes.

8. A system, comprising:
   an attached storage device, the attached storage device including:
      a read-only base volume stored in at least one solid state drive, wherein the at least one solid state drive is mirrored with at least one additional solid state drive;
      a plurality of volumes, each of the plurality of volumes of the attached storage device including a redirect on write snapshot of the read-only base volume of the attached storage device;
      a cache, the cache including:
         a dedicated portion of the cache configured to store frequently accessed data of the read-only base volume; and
         a plurality of dedicated portions of the cache, each of the plurality of dedicated portions of cache configured to store frequently accessed data of a particular volume of the plurality of volumes; and
   a plurality of diskless computing devices that boot from the read-only base volume,
   wherein the read-only base volume contains at least one operating system and at least one application program common to the plurality of diskless computing devices,
   wherein writes received from the plurality of diskless computing devices for the read-only base volume are redirected to a particular volume of the plurality of volumes, and
   wherein each of the plurality of volumes of the attached storage device is dedicated to a particular diskless computing device of the plurality of diskless computing devices and each of the plurality of volumes of the attached storage device store data particular to the particular diskless computing device of the plurality of diskless computing devices, the data particular to the particular diskless computing device comprising at least one of a registration key, at least one virtual memory swap space, or at least one temporary file.

9. The system of claim 8, wherein the plurality of volumes are stored in at least one hard disk drive.

10. The system of claim 8, wherein the plurality of volumes are stored in a plurality of hard disk drives configured in a RAID (redundant array of independent disks).

11. The system of claim 8, wherein the attached storage device is operable to subsequently add new common data to the read-only base volume.

12. The system of claim 8, wherein the attached storage device comprises an attached RAID (redundant array of independent disks) device.

13. The system of claim 8, wherein an amount of the portion of the cache configured to store frequently accessed data of the read-only base volume is more than a portion of the cache if the cache were divided proportionally among the plurality of volumes.

14. The system of claim 8, wherein each of the plurality of diskless computing devices is configured to access:
the read-only base volume,
the dedicated portion of the cache configured to store frequently accessed data of the read-only base volume,
the particular volume of the plurality of volumes of the attached storage device dedicated to a particular diskless computing device of the plurality of diskless computing devices, and
a particular dedicated portion of the plurality of dedicated portions of cache configured to store frequently accessed data of the particular volume of the plurality of volumes.

15. The system of claim 14, wherein the attached storage device presents a virtual volume to each of the plurality of diskless computing devices such that each of the plurality of diskless computing devices views a single storage volume and is not aware of the read-only base volume and the particular volume of the plurality of volumes dedicated to the particular diskless computing device.

16. A method, comprising:
root booting a plurality of diskless computing devices from a read-only base volume of an attached storage device, the read-only base volume stored in at least one solid state drive, the read-only base volume containing at least one operating system and at least one application program common to the plurality of diskless computing devices;
receiving writes for the read-only base volume from the plurality of diskless computing devices;
redirecting the writes for each of the plurality of diskless computing devices to a particular volume of a plurality of volumes of the attached storage device, each of the plurality of volumes of the attached storage device including a redirect on write snapshot of the read-only base volume, each of the plurality of volumes of the attached storage device being dedicated to a particular diskless computing device of the plurality of diskless computing devices and storing data particular to the particular diskless computing device of the plurality of diskless computing devices, the data particular to the particular diskless computing device comprising at least one of at least one registration key, at least one virtual memory swap space, or at least one temporary file;
storing frequently accessed data of the read-only base volume in a dedicated portion of a cache of the attached storage device;
storing frequently accessed data of the plurality of volumes in a plurality of dedicated portions of the cache, each dedicated portion of the plurality of dedicated portions of the cache configured to store frequently accessed data of the particular volume of the plurality of volumes;
determining data common to each of the plurality of volumes;
updating the read-only base volume to include the data common to each of the plurality of volumes;
removing, from the plurality of volumes of the attached storage device, the data common to each of the plurality of volumes upon updating the read-only base volume to include the data common to each of the plurality of volumes; and
mirroring the at least one solid state drive with at least one additional solid state drive,
wherein an amount of the dedicated portion of the cache configured to store frequently accessed data of the read-only base volume is more than an amount of a portion of the cache if the cache were divided proportionally among the plurality of volumes.

* * * * *